United States Patent [19]

Larner

[11] Patent Number: 4,523,476
[45] Date of Patent: Jun. 18, 1985

[54] PRESSURE TRANSDUCER

[75] Inventor: Donald A. Larner, Kingston-Upon-Thames, England

[73] Assignee: Fluid Devices Limited, England

[21] Appl. No.: 585,143

[22] Filed: Mar. 1, 1984

[30] Foreign Application Priority Data

Mar. 3, 1983 [GB] United Kingdom ............... 8305927

[51] Int. Cl.³ ............................................. G01L 7/16
[52] U.S. Cl. ................................................. 73/744
[58] Field of Search ..................... 73/744, 745, 746; 340/58

[56] References Cited

U.S. PATENT DOCUMENTS 3,145,570 8/1964 Grandstaff .
3,347,094 10/1967 Schroeder et al. .
4,416,211 11/1983 Hoffman ............................. 73/744

FOREIGN PATENT DOCUMENTS 0000818 2/1979 European Pat. Off. ............. 340/58
0506915 6/1920 France ................................ 73/744

Primary Examiner—Donald O. Woodiel
Attorney, Agent, or Firm—Ostrolenk, Faber, Gerb & Soffen

[57] ABSTRACT

A differential pressure gauge 10 utilizes a piston member 18 provided with a series of grooves 19 right around it, so that the piston member 18 itself forms the rack of a rack-and-pinion device (pinion 22) for converting linear displacement of the piston member into rotary displacement of the pinion. For sensitivity and accuracy, the seal between the piston member 18 and the passage 13 is a hard-surface-to-hard-surface engagement between substantial (total) hard surface areas at any one time of the passage 13 and the piston member 18, including regions of the surface area of the piston member 18 intermediate mutually adjacent end ones of the grooves 19. In this way, the gauge is insensitive to the base pressure, there being no soft seals to deform under pressure. A magnetic coupling is used through the wall of the housing, which can thus be made completely pressure-tight.

One embodiment indicates a reverse differential pressure by allowing the piston to travel beyond the normal end position upon overcoming the preload of a second spring.

9 Claims, 3 Drawing Figures

PRESSURE TRANSDUCER

BACKGROUND OF THE INVENTION

1. Field of the Invention

This invention relates to a pressure transducer.

More particularly, the invention relates to a pressure transducer of a type comprising a housing provided with a cylindrical passage therein and a pressure connection at one end of the passage, a substantially cylindrical member arranged in said passage so as to be longitudinally slidable therein, with sealing means between said member and the passage, so that pressure applied at said one end of the passage via said pressure connection biases said member away therefrom, a spring for biasing said member towards said one end against said pressure, and rack and pinion means within the housing for converting linear displacement of said member into rotary displacement of the pinion, the rack being formed by grooves in the member itself.

2. Description of the Prior Art

French Patent Specification No. 506 915 discloses such a type of presssure transducer in FIGS. 1 to 3 thereof. However, the pressure gauge of FIGS. 1 to 3 of FR-PS No. 506 915 is not a differential pressure gauge. Furthermore, it necessarily uses positive sliding seals. Furthermore, the rack of the rack and pinion means is formed by a tubular body c2 which is not itself a pressure-sensing element but is attached to a positively sealed piston c which depends upon a flexible lipped seal c1. The relatively high level of frictional hysteresis generated by such sealing means is well known.

FIG. 5. of French Patent Specification No. 506 915 relates to a simple pressure gauge (not a differential pressure gauge) utilising a piston member with opposed differential areas so as to reduce the force to be opposed by the spring at high pressures. In this case there are two sliding flexible seals, each resisting and fully containing the full system pressure relative to atmosphere. The sensitivity of such an instrument would of course be very limited.

Other, less relevant prior art, includes GB No. 2 010 596 A, which discloses an example of a magnetic coupling which uses a non-magnetic "window" in an otherwise magnetic casing; DE No. 2 747 047, which discloses another and very elaborate, form of magnetic coupling; U.S. Pat. No. 4,014,284, which discloses a relatively crude device, not intended for accurate measurement of differential pressure, because of a great deal of friction produced at the flat seating faces of both pairs of magnets as a consequence of their respective mutual attractions; it is not a gauge as such, but an indicator in which friction can be allowed for because the device need only react to increasing pressure; the mechanism for converting linear to angular movement is functionally separate from the piston (although connected to it); and finally U.S. Pat. No. 3,429,291 and FR No. 2 470 374, neither of which is particularly relevant because each depends on purely magnetic coupling means with one magnet actually incorporated into the piston itself.

SUMMARY OF THE INVENTION

According to the present invention there is provided a pressure transducer comprising a housing provided with a cylindrical passage therein and a pressure connection at one end of the passage, a substantially cylindrical member arranged in said passage so as to be longitudinally slidable therein, with sealing means between said member and the passage, so that pressure applied at said one end of the passage via said pressure connection biases said member away therefrom, a spring for biasing said member towards said one end against said pressure, and rack and pinion means within the housing for converting linear displacement of said member into rotary displacement of the pinion, the rack being formed by grooves in the member itself, characterised in that the pressure transducer is a differential pressure transducer having another pressure connection at the other end of the passage, so that a possibly different pressure applied at said other end of the passage via said other pressure connection biases said member away from said other end, and in that said sealing means between said member and the passage is formed by virtue of a closely fitting, yet freely sliding, hard-surface-to-hard-surface engagement between a substantial (total) hard surface area at any one time of said passage and a substantial (total) hard surface area at any one time of said member, including regions of the surface area of said member intermediate mutually adjacent ones of said grooves.

Preferably the pinion is sealed inside the housing and the rotary displacement of the pinion is coupled via a magnetic coupling through a wall of the housing to an external rotary member. Such rotary member may form, or be connected to, a rotary pointer on a scale, for example.

Preferably some or all of the grooves each extend right around the substantially cylindrical member.

The invention will be further described by way of example with reference to the accompanying drawings.

DESCRIPTION OF THE PREFERRED EMBODIMENTS

Figure 1:
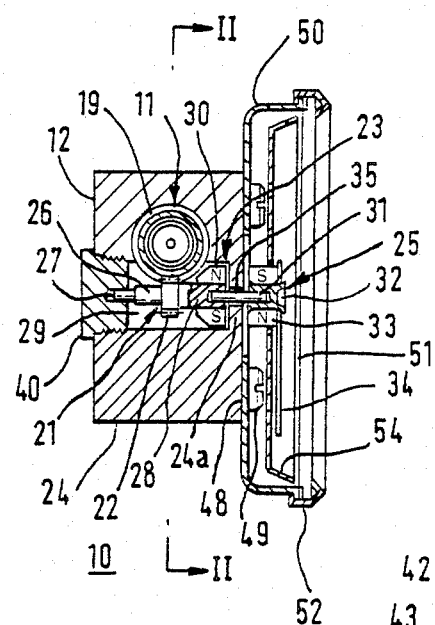
FIG. 1 is a full transverse sectional illustration of a differential pressure gauge embodying the invention, taking in the plane indicated at I—I in FIG. 2.
Figure 2:
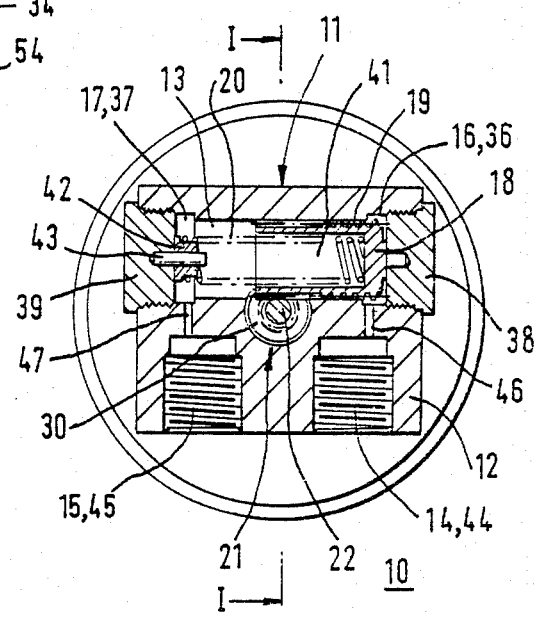
FIG. 2 is a longitudinal section in the plane indicated at II—II in FIG. 1.

Referring to FIGS. 1 and 2 of the drawings, the differential pressure gauge 10 illustrated therein includes a differential pressure transducer 11 comprising a (pressure tight) housing 12 provided with a cylindrical passage 13 therein and two pressure connections 14, 15 at respective ends 16, 17 of the passage 13. A substantially cylindrical piston member 18 is arranged in the passage 13 so as to be longitudinally slidable therein. Sealing means between the piston member 18 and the passage 13 is formed by virtue of a closely fitting, yet freely sliding, hard-surface-to-hard-surface engagement between a substantial (total) hard surface area at any one time of the passage 13 and a substantial (total) hard surface area at any one of the piston member 18, including regions of the surface area of the piston member 18 intermediate mutually adjacent end ones of grooves 19 in the piston member 18, each of the grooves 19 extending right around the piston member 18. Hence, pressure applied at either end 16 or 17 of passage 13 via the respective pressure connection 14 or 15 biases the piston member 18 away therefrom. A spring 20 biases the piston member 18 towards the passage end 16, against the pressure applied thereat via the pressure connection 14.

The grooves 19 in the piston member 18 form the rack of rack and pinion means 21 within the housing 12 for converting linear displacement of the piston member into rotary displacement of a pinion 22.

The pinion 22 is sealed inside the housing 12 and the rotary displacement of the pinion 22 is coupled via a magnetic coupling 23 through a wall 24 of the housing 12 to an external rotary member 25.

The piston member 18 is closely fitting but freely slidable in the passage 13 and, because no sealing glands or positive sliding seals are employed, the freedom of movement of piston member 18 is unaffected by variation in the base pressure of an hydraulic system to which the differential pressure gauge 10 may be connected. Whilst a small leakage of fluid will take place, past the piston member 18, induced only by the relatively low pressure differential across piston member 18, this can be held to an acceptable level by the maintenance of a reasonably close fit between piston member 18 and cylindrical passage 13. In any event, the type of application for which this pressure gauge 10 may be used is unlikely to be unduly sensitive to the effects of such modest leakage.

The grooves 19 are equally spaced along the length of the outside surface of piston member and their collective longitudinal sectional profile corresponds to that of an involute rack of suitable pitch.

A transverse axle 26 is carried on bearings 27 and 28 within a chamber 29 formed within the housing 12 and transversely intercepting and communicating with passage 13. The pinion 22 is formed on part of the length of the axle 26, which pinion 22 engages tangentially with the rack like profile of piston member 18. The magnetic coupling 23 comprises a permanent magnet 30 of substantially cylindrical form, mounted upon and fixed to the axle 26 closely adjacent a relatively thin section 24a of the chamber wall 24.

Mounted on a bearing 31 outside the housing 12 and closely adjacent the wall section 24a is a hub 32 on which are mounted and clamped together with moderate force by crimping of the outer end of the said hub 32, a further substantially cylindrical magnet 33 of the magnetic coupling 23 and an indicating pointer 34.

Both magnets 30 and 33 are magnetized across their respective diameters, as indicated in FIG. 1 so that, by mutual attraction of unlike poles, they always maintain a fixed relative angular relationship about their mutual axis of rotation.

Either magnet may be replaced in a modification, not shown, in the interests of economy by a suitably shaped ferro-magnetic armature made of mild steel, soft iron or the like and depending on magnetic induction from the remaining other magnet for the maintenance of flux linkage, but in such an arrangement there would be ambiguity in the relative angular relationship of the coupling elements and the two magnet arrangement shown is therefore to be preferred.

The bearings at 28 and 31 are each mounted on separate stub shafts formed as extensions from each end of a member 35 which is sealed into the wall part 24a so as to be co-axial with chamber 29, the end of each stub shaft being formed into a cone to engage with the flat bottom of its respective bearing in known manner, to form a thrust pivot for the support of the force induced by the mutual attraction of magnets 30 and 33 without the generation of significant friction torque when relative movement takes place. Other forms of combined radial/axial bearing may be employed, but the method shown has been found to be effective and is cheap to produce.

Both ends 16 and 17 of passage 13 are relieved by enlargements at 36 and 37 and receive threaded sealing plugs 38 and 39. The chamber 29 is similarly enclosed and sealed by a plug 40 which also provides for the location and support of bearing 27.

Housed partly within passage 13 and partly within a flat bottomed bore 41 formed in the piston member 18 is the compression spring 20, in one end of which is screwed a spring rest 42 having a helical groove of suitable cross sectional shape and pitch formed on its exterior surface for the purpose. The effective diameter of the groove in relation to that of the spring 20 is such that the spring 20 is slightly distended by the penetration of the spring rest 42 and is thereby caused to grip the spring rest 42 positively and thus retain its pre-set position relative thereto. The part of the spring 20 which is engaged with the spring rest 42 is immobilized and rendered inactive, thus modulating the load rate of the spring 20 as a whole and permitting its adjustment to the exact value required to give correct readings of the gauge 10 in relation to the applied pressure differential at all values within the prescribed range of the gauge 10. A pin 43 fixed into sealing plug 38 provides positive radial location for the spring rest 42.

The pressure connections 14 and 15 comprise connecting ports 44 and 45 formed in the housing 12 for the communication of the differential pressure components to the respective ends 16, 17 of passage 13 via ducts 46 and 47, these latter being of restricted cross-sectional area to provide damping of the gauge action in the event of sudden application or variation of pressure.

Affixed to the exterior of the housing 12 at 48 by screws such as 49 is a casing 50 provided with a viewing window 51 clamped thereto by a closure ring 52 with the interposition of a soft sealing ring 53, this assembly of parts serving to enclose and protect the indicating assembly formed by items 32, 33 and 34 together with a dial 54 (supporting means not shown) on the face of which is marked a graduated scale (not shown) with which pointer 34 coacts to offer a visible measure of the magnitude of the net pressure differential applied to the gauge from time to time.

In use, the higher differential pressure component is applied via pressure connection 14 to the passage end 16 and the lower component via pressure connection 15 to the passage end 17, thus inducing a net axial force on the piston member 18 equal to the algebraic sum (that is, the difference between the magnitudes) of the two pressure components multiplied by the effective cross-sectional area of the piston member 18, which thereupon moves in the passage 13 to the left (as drawn) until a position of force equilibrium is reached wherein the increased compression of the spring 20 produces a reaction force on the piston member 18 exactly equal to the said nett axial force induced by the applied differential pressure components.

The displacement of the piston member 18 thus brought about is transmitted through pinion 22, axle 26 and magnetic coupling 23 to the hub 32 which rotates pointer 34, causing it to move over the graduated scale marked on the face of dial 54 and thus present a visible measure of the magnitude of the net pressure differential applied to the gauge 10. Any further variations in applied differential pressure cause proportionally corresponding changes in the value indicated by the pointer 34.

The crimping of magnet 33 and indicating pointer 34 to the hub 32 is controlled to give a firm retaining friction grip between them so that magnet 33 and pointer 34 can be adjusted manually to effect accurate zero setting of the pointer 34 relative to the scale on the dial 54.

Figure 3:
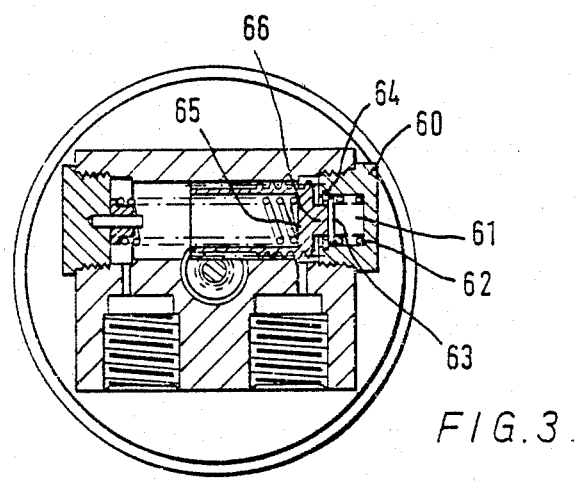
FIG. 3 is a view corresponding to FIG. 2 of a modification.

Referring to FIG. 3, the modification illustrated therein is adapted to indicate clearly when a reverse pressure differential is detected, that is to say, to indicate clearly when the pressure at the pressure connection 15 is greater than the pressure at the pressure connection 14. To this end, in the embodiment of FIG. 3, the sealing plug 38 of FIG. 2 is replaced by a sealing plug 60 having formed within it a cavity 61 containing an additional compression spring 62, axially pre-loaded by a disc 63 which is positioned and supported by a circlip 64. The piston member 18 of FIGS. 1 and 2 is replaced by a modified piston member 65 having a projection 66. The piston member 65 is shown at its normal, zero-pressure-differential position. When a reverse pressure differential is detected (that is, when the pressure at connection 15 exceeds the pressure at connection 14) the piston member 65 is biased to the right and, upon overcoming the weak preload on the spring 62 (for example, at a pressure of 1 pound per square inch or 0.07 bar) compresses the spring 62 in moving rightwards beyond its normal zero-pressure-differential position. Thus, a negative indication is given on the gauge scale to signify that an unquantified reverse, or negative, pressure differential is being detected. On cessation of such reverse pressure differential, the piston member 65 resets to the zero position shown, as the disc 63 returns to its initial position abutting the circlip 64. In other respects, the gauge of FIG. 3 is identical to the gauge 10 of FIGS. 1 and 2.

Either gauge can measure accurately and reliably, very small unidirectional pressure differentials in a fluid system, particularly an hydraulic system, operating at a very high base pressure. Either gauge may be used for example in high pressure hydraulic power transmission systems for the measurement of flow-induced pressure drops across system components such as flow sensors, control valves, fluid filters and the like. In particular, either gauge may be used in conjunction with the fluid flow transducer which is the subject of a co-pending patent application No. 585,144, filed Mar. 1, 1984. The grooves 19, being all annular, may act as hydrostatic pressure-balancing grooves for the maintenance of uniform peripheral pressure distribution at all positions along the length of the piston member 18/65.

It will be appreciated that space is conserved by accommodating the spring 20 within the piston member 18 (65).

Because the pinion 22 is sealed inside the housing 12, and the magnetic coupling 23 is used to couple the pointer to the piston member, a very high base pressure can be applied to the gauge.

I claim:

1. A pressure transducer comprising a housing provided with a cylindrical passage therein and a pressure connection at one end of the passage, a substantially cylindrical member arranged in said passage so as to be longitudinally slidable therein, with sealing means between said member and the passage, so that pressure applied at said one end of the passage via said pressure connection biases said member away therefrom, a spring for biasing said member towards said one end against said pressure, and rack and pinion means within the housing for converting linear displacement of said member into rotary displacement of the pinion, the rack being formed by grooves in the member itself, characterised in that the pressure transducer is a differential pressure transducer having another pressure connection at the other end of the passage, so that a possibly different pressure applied at said other end of the passage via said other pressure connection biases said member away from said other end, and in that sealing means between said member and the passage is formed by virtue of a closely fitting, yet freely sliding, hard-surface-to-hard-surface engagement between a substantial (total) hard surface area at any one time of said passage and a substantial (total) hard surface area at any one time of said member, including regions of the surface area of said member intermediate mutually adjacent ones of said grooves.

2. A pressure transducer according to claim 1 characterised in that the pinion is sealed inside the housing and the rotary displacement of the pinion is coupled via a magnetic coupling through a wall of the housing to an external rotary member.

3. A pressure transducer according to claim 1 characterised in that at least some of said grooves each extend right around said substantially cylindrical member.

4. A pressure transducer according to claim 1 wherein adjustable means is provided for immobilising an adjustable length of the spring so as to vary its effective rate.

5. A pressure transducer according to claim 4 wherein said adjustable means comprises a spring rest having a helical groove to engage part of the spring.

6. A pressure transducer according to claim 1 wherein a preloaded second spring is arranged for compression by said cylindrical member upon displacement thereof beyond a "zero-differential pressure" position in the event of nett differential pressure biasing said cylindrical member towards said one end.

7. A pressure gauge comprising a housing provided with a cylindrical passage therein and a pressure connection at one end of the passage, a substantially cylindrical member arranged in said passage so as to be longitudinally slidable therein, with sealing means between said member and the passage, so that pressure applied at said one end of the passage via said pressure connection biases said member away therefrom, a spring for biasing said member towards said one end against said pressure, rack and pinion means within the housing for converting linear displacement of said member into rotary displacement of the pinion, the rack being formed by grooves in the member itself, and an indicator coupled to said pinion, characterised in that the pressure transducer is a differential pressure transducer having another pressure connection at the other end of the passage, so that a possibly different pressure applied at said other end of the passage via said other pressure connection biases said member away from said other end, and in that sealing means between said member and the passage is formed by virtue of a closely fitting, yet freely sliding, hard-surface-to-hard-surface engagement between a substantial (total) hard surface area at any one time of said passage and a substantial (total) hard surface area at any one time of said member, including regions of the surface area of said member intermediate mutually adjacent ones of said grooves.

8. A pressure gauge according to claim 7 wherein the indicator is coupled to said pinion via a friction coupling enabling adjustment of the position of the indicator relative to the position of the pinion.

9. A pressure gauge according to claim 7 characterised in that the pinion is sealed inside the housing and the rotary displacement of the pinion is coupled via a magnetic coupling through a wall of the housing to an external rotary member;

characterised in that at least some of said grooves each extend right around said substantially cylindrical member;

wherein adjustable means is provided for immobilising an adjustable length of the spring so as to vary its effective rate;

wherein said adjustable means comprises a spring rest having a helical groove to engage part of the spring;

wherein a preloaded second spring is arranged for compression by said cylindrical member upon displacement thereof beyond a "zero-differential pressure" position in the event of nett differential pressure biasing said cylindrical member towards said one end and wherein the indicator is coupled to said pinion via a friction coupling enabling adjustment of the position of the indicator relative to the position of the pinion.

* * * * *